United States Patent [19]

Beeley

[11] Patent Number: 5,067,264
[45] Date of Patent: Nov. 26, 1991

[54] FLEXIBLE ROTARY SNOW TILLER

[75] Inventor: Michael G. Beeley, Logan, Utah

[73] Assignee: Logan Manufacturing Company, Logan, Utah

[21] Appl. No.: 40,820

[22] Filed: Apr. 21, 1987

[51] Int. Cl.$^5$ .......................... E01H 4/00; A01B 33/16
[52] U.S. Cl. ......................................... 37/222; 172/72; 172/117; 172/112
[58] Field of Search ................. 37/258, 259, 224, 219, 37/221, 223, 222, 196, DIG. 8, 66, 189, 108 R; 172/117, 310, 311, 123, 456, 60; 56/6, 296, 297, 228, 16.2, 7; 403/56

[56] References Cited

U.S. PATENT DOCUMENTS

| | | | |
|---|---|---|---|
| 2,538,167 | 1/1951 | Schmeiser | 37/224 X |
| 3,085,385 | 4/1963 | Hansen et al. | 56/7 |
| 3,564,822 | 2/1971 | Engler | 56/6 X |
| 4,102,404 | 7/1978 | Krammer | 172/310 |
| 4,359,831 | 11/1982 | Beeley | 37/258 X |
| 4,487,004 | 12/1984 | Kejr | 56/297 X |
| 4,523,398 | 6/1985 | Scheibel | 37/222 |
| 4,538,400 | 9/1985 | Hottes | 56/6 X |
| 4,559,725 | 12/1985 | Wieland et al. | 37/222 |
| 4,775,014 | 10/1988 | Ranner | 37/222 |
| 4,790,389 | 12/1988 | Adee et al. | 172/311 |
| 4,825,958 | 5/1989 | Kelderman | 172/311 |
| 4,878,545 | 11/1989 | Dyken | 172/456 |
| 4,892,154 | 1/1990 | Ranner | 172/72 |

FOREIGN PATENT DOCUMENTS 954011 9/1982 U.S.S.R. ......................... 172/310

Primary Examiner—Edgar S. Burr
Assistant Examiner—Kimberly L. Asher
Attorney, Agent, or Firm—A. Ray Osburn

[57] ABSTRACT

The flexible tiller has a center and two end sections, each including a cutter bar, frame, apron and grooming bar. The two tiller end sections are connected flexibly to the ends of the center section by frame to frame hinges and by cutter to cutter universal joints, so that the end sections can rotate freely about the hinges. The tiller center section is secured to the towing mechanism to oscillate about a central horizontal axis in the direction of travel. The oscillating center section and the two pivotally attached end sections cooperate to enable the tiller to closely conform to and thoroughly groom rolling snow paths without reducing them to flat ones. The rolling paths are enjoyable to ski, and are slower and safer. A controllable hydraulic ram is mounted to act across each hinge, so that the operator may select the degree of bending permitted at each hinge, and may hydraulically lock it into selected position, if desired.

27 Claims, 6 Drawing Sheets

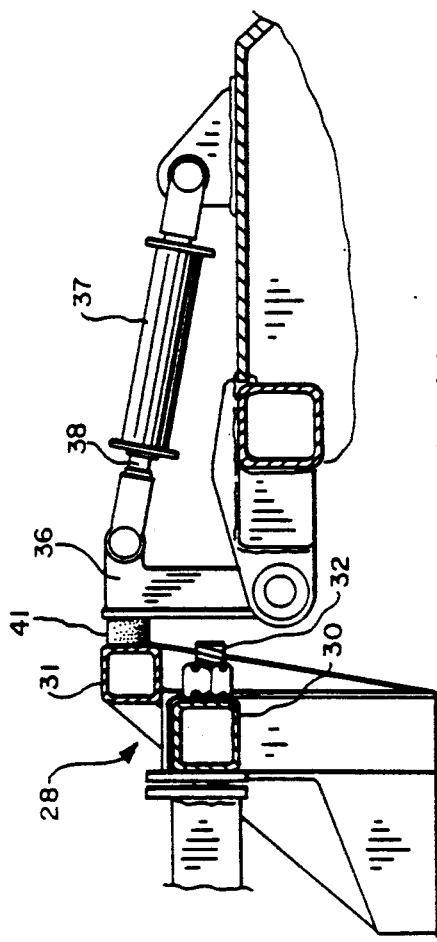
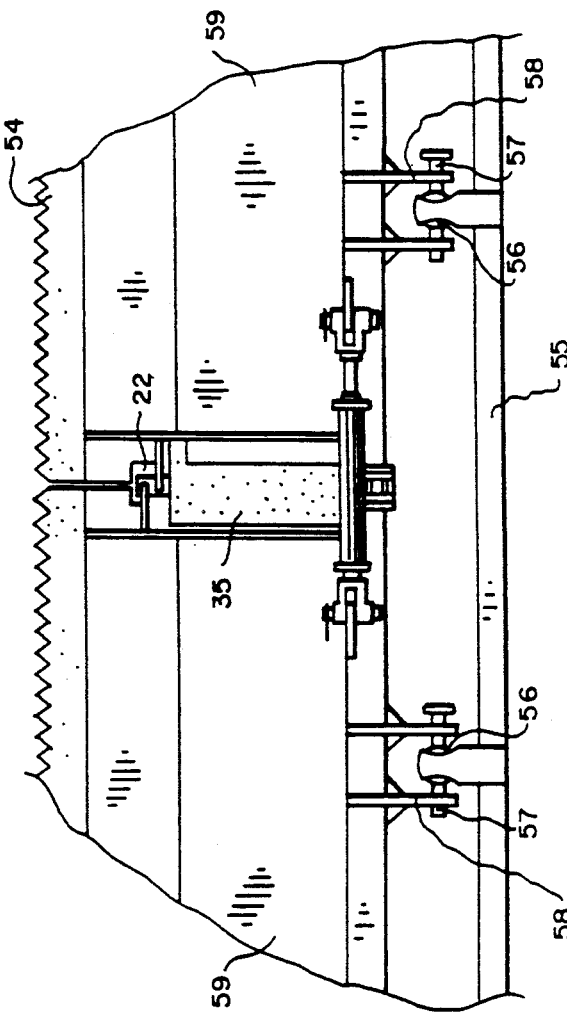
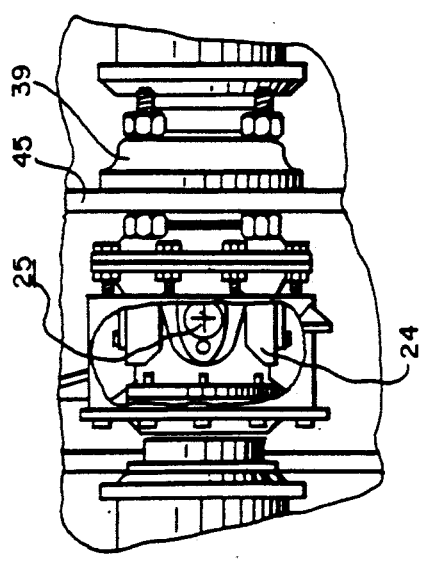
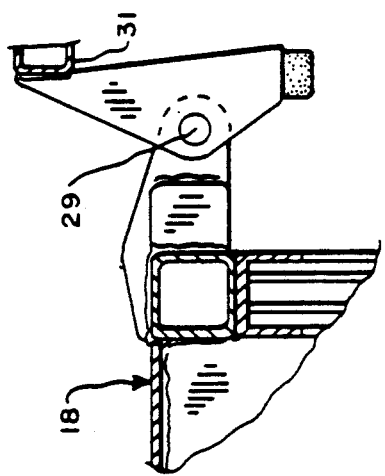

FLEXIBLE ROTARY SNOW TILLER

BACKGROUND OF THE INVENTION

1. Field

The field of the invention is snow conditioning and grooming devices which chop, grind, and stir the snow, and more particularly such devices for producing rolling ski paths by thoroughly grooming uneven snow surfaces without excessively flattening their contours.

2. State of the Art

Various snow-grooming devices have been used to smooth and recondition snow surfaces for ski slopes, generally being drawn over the snow behind a tracked vehicle. Examples are unpowered harrows, rotating discs, rollers and the like to break up and level the snow surface. In contrast, snow tiller are powered to agressively break up and cut the snow so that the conditioned surface is relatively fine grained, and preferably lightly but firmly packed for easy, enjoyable skiing. Such tillers comprise elongate, toothed cutter bars mounted on frames and powered to rotate by vehicle power take-offs, or separate independent combustion or hydraulic engines mounted directly on the tiller frame. See U.S. Pat. No. 4,359,831. The cutter bar teeth may be radially projecting blades or spikes. In some instances appended lengths of chain are used to mulch the snow surface.

The tillers are towed by endless track vehicles, and must groom paths of 12 to 16 feet to cover the track marks. Typically, the entire path is groomed all across by a rigid. cutter bar. The rigid cutter bar cannot conform to sinuously rolling snow surfaces, tending to work the high places but bridge over the valleys between. Rolling paths thus tend to be reduced to quite flat ones. It is difficult or impossible to produce uniformly groomed yet rolling paths, which are very enjoyable to ski and are desirably slower and safer. Some present tillers do have provisions allowing them to freely rotate about an axis in the direction of travel. U.S. Pat. No. 4,359,831, for example, incorporates an "oscillation" bar and coupling for this purpose. Such devices allow the cutters to act somewhat independently of the towing vehicle attitudes to better conform to rough snow surfaces. They fail to alleviate the bridging problem discussed above. Nor does the two segment, "flexibly coupled" cutter bar of said patent. The two axially aligned cutter bar segments are coupled only sufficiently flexible to relieve bearing alignment and frame deflection problems. The coupling flexes only to compensate for any deflection of the tiller frame, so that the cutter segments remain substantially aligned. The bridging problem is therefore not substantially relieved.

At least one attempt has been made to replace the monolithic cutter bars with bars having a pair of sections coupled by a connector capable of bending through large angles. See the "Information Disclosure" filed herewith. High flexure couplings appear to be also required at the outside ends of the cutter bar, and the constantly changing distance between these ends must somehow be accommodated. The coupled two part cutter bar can bend with respect to its mounting frame, to somewhat alleviate the bridging. However, the frame is believed to be rigid and monolithic. The attached snow apron and grooming or compactor bar, are also monolithic and therefore cannot follow the flexing cutter bar, so that any grooming advantages are largely cancelled.

BRIEF SUMMARY OF THE INVENTION

With the foregoing in mind, the present invention eliminates or substantially alleviates the disadvantages in prior art snow tillers by providing a flexible tiller, which in its presently preferred embodiment comprises a center and two side sections, each one being a complete tiller unit including at least a cutter bar and an associated frame, and preferably also an apron and a grooming bar or other following grooming provisions. The tiller center section is preferably adapted to be secured to a towing vehicle in a manner permitting it to freely rotate about a forwardly directed, central horizontal axis. Each of the two tiller end sections are connected flexibly to ends of the tiller center section by frame to frame hinges and by cutter bar to cutter bar universally flexing joints. Each universal joint is located on the axis of the associated hinge, so that each end tiller section can rotate freely as a unit about the hinge. The oscillating center section and the two pivotally attached end sections deflect cooperatively in response to the snow contours to enable the cutter bars to closely conform to and thoroughly groom rolling snow paths without reducing them to flat ones. The rolling paths are enjoyable to ski, and are slower and safer.

The universal joints enable the three cutter bar sections, regardless of their condition of alignment, or misalignment, to rotate together about their respective longitudinal axes. Preferably, one or more hydraulic motors are used to power the cutter bars, preferably from frame mountings at the outside end of one or both of the side tiller sections. Preferably, hydraulic cylinder and ram assemblies are mounted for the ram to act across the hinges. During the operation, the rams are normally allowed to reciprocate freely within the cylinders. However, each can be used to set and hold a fixed angle between the center and either or both of the end tiller sections, should this be desired.

For still closer conformity to uneven snow surfaces, one or more additional side sections could be incorporated, all flexibly connected serially, all cutter bars then being powered by the motors then mounted on the outermost side section frames.

Therefore, it is the principal object of the invention to provide an improved snow tiller particularly adapted to thoroughly groom uneven snow surfaces to produce paths of rolling contours, for enjoyable, safer skiing.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
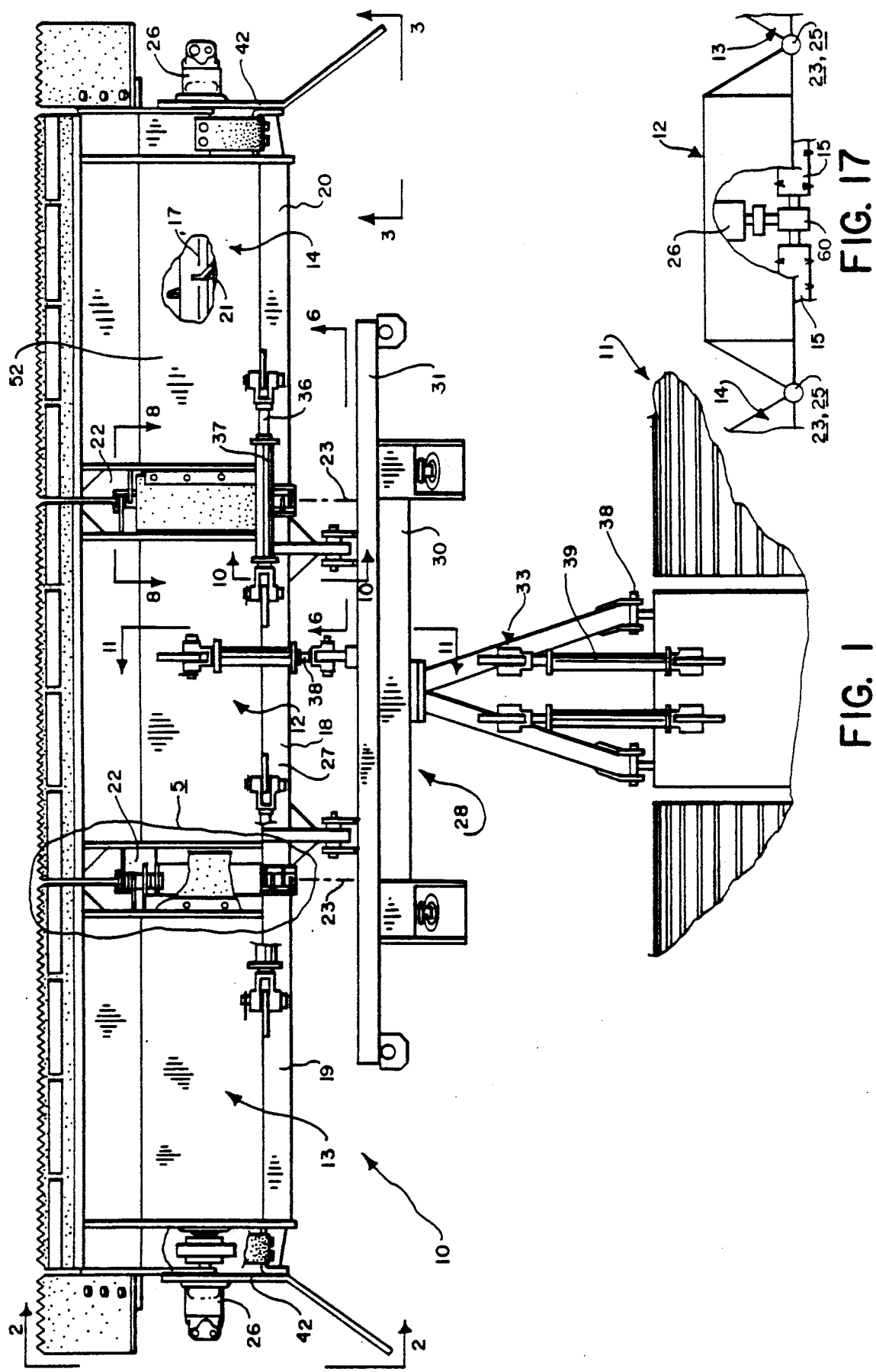
FIG. 1 is a plan view of a tiller in accordance with the invention, incorporating three separate, flexibly joined complete tiller sections, illustrated attached to a towing vehicle, fragmentally shown, drawn to a reduced scale, FIG. 2 a side elevation view of the tiller of FIG. 1, taken along line 2—2 thereof, drawn to the same scale, FIG. 3 an elevation view of an end fragment of one of the outside tiller sections of FIG. 1, taken along line 3—3 of FIG. 1, drawn to the same scale, FIG. 4 a bottom plan view of the fragment of FIG. 3, taken along line 4—4 thereof, drawn to the same scale, FIG. 5 a plan view of a fragment of the tiller of FIG. 1 showing area 5 thereof, partially cut away to show the hinges connecting the tiller section frames, drawn to an enlarged scale, FIG. 6 an elevation view of a fragment of the tiller of FIG. 1, taken along line 6—6 thereof, drawn to the scale of FIG. 5, FIG. 7 a bottom plan view of the fragment of FIG. 6, taken along line 7—7 thereof, drawn to the same scale, FIG. 8 an elevation view of a fragment of the tiller of FIG. 1, taken along line 8—8 thereof, drawn to the scale of FIG. 5, FIG. 9 a bottom view of the fragment of FIG. 6, taken along line 9—9 thereof, drawn to the same scale, FIG. 10 an elevation view of a fragment of the tiller of FIG. 1, taken along line 10—10 thereof, drawn to an enlarged scale, FIG. 11 an elevation view of a fragment of the tiller of FIG. 1, taken along line 11—11 thereof, drawn to the scale of FIG. 5, FIG. 12 a schematic representation of the tiller of FIG. 1, illustrating its flexed position to conform to the uneven contours of a snow path being tilled, FIG. 13 a schematic showing the tiller conforming to the contours of another snow path, FIG. 14 a schematic indicating the tiller conforming to the contours of still another uneven snow path, FIG. 15 a schematic indicating an embodiment of the tiller having five complete sections, FIG. 16 a plan view of a tiller in accordance with the invention having only two flexibly joined tiller sections, secured to a towing mechanism similar to that of the three part tiller, ball joints being employed to permit the flexing, and FIG. 17 a schematic representation of an embodiment wherein the cutter bars are powered by a hydraulic motor and gear box, both mounted on one of the inside tiller sections.

In FIG. 1, a tripartite snow tiller 10 in accordance with the invention is illustrated attached in operational position to a tracked vehicle 11. Illustrated tiller 10 comprises three generally equal length tiller sections, a center section 12 and side sections 13 and 14. (See FIG. 1) The three tiller sections are secured together end to end to span the snow path to be tilled. Tiller sections 12, 13 and 14 each have rotating snow cutter bars 15, 16 and 17 respectively, and frames 18, 19 and 20 respectively. Each cutter bar has a multiplicity of radially projecting cutting blades 21. The side frames 19 and 20 are each secured to opposite ends of the center frame 18 through a pair of aligned hinges 22. The hinges axes 23 are both generally horizontal and parallel to the direction of travel. (FIGS. 1, 5, 7 and 8) The cutter bars 16 and 17 of the side tiller sections are connected to opposite ends of center cutter bar 15 through a universally flexing joint 24. The centers of flexing 25 of the universal joints 24 are each located upon one of the horizontal axes 23 of one of the frame hinges 22. Thus, each of the two side tiller sections 13 and 14 may rotate about its respective hinge axis 23 as a unit, both upwardly and downwardly. The universal joints 24 permit all the joined together cutter bars to be simultaneously rotated regardless of their condition of alignment or misalignment. For this purpose, a pair of hydraulic motors 26 each engage one of the extending drive shafts, not shown, of the side cutter bars 16 and 17 near an outside end of an outside frame 19 or 20. (FIGS. 1-3 and 4)

Figure 12:
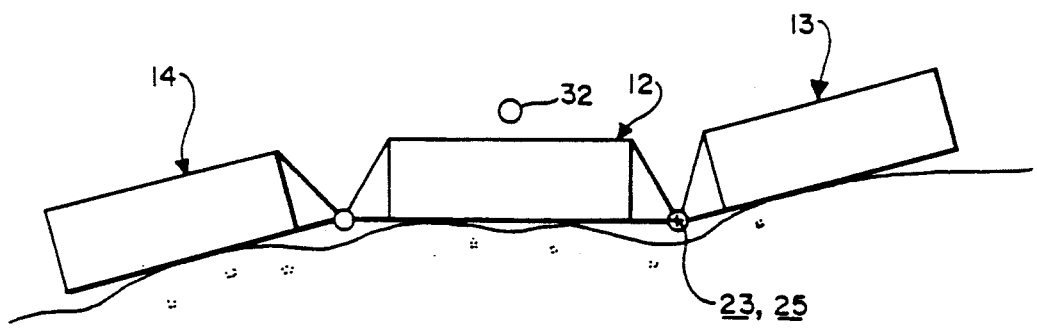
Figure 13:
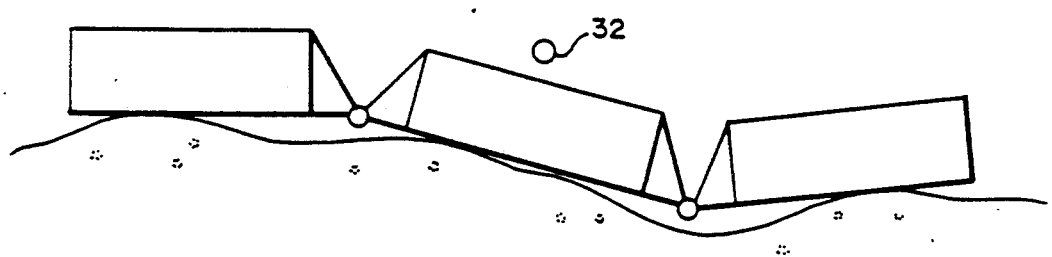
Figure 14:
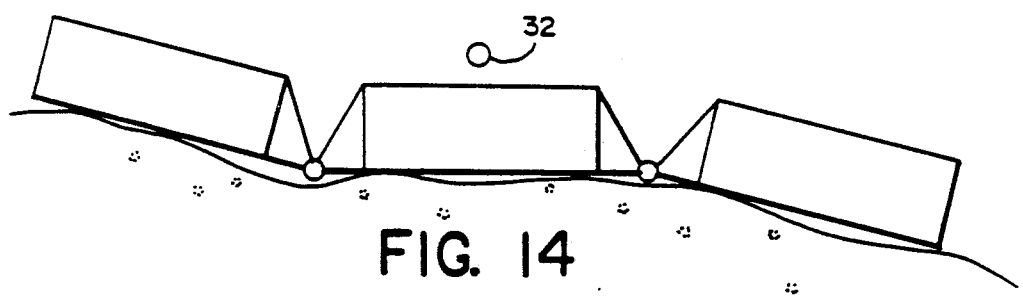

Center tiller frame 18 has a square main frame member 27 secured to an oscillation frame 28 through a pair of aligned horizontal pivots 29 oriented laterally to the direction of travel. Oscillation frame 28 comprises a lower, square, oscillation tube 30 and an upper reinforcing square tube 31, which carries the aforesaid pivots 29. (FIGS. 1, 2 and 10) Oscillation frame 28 is in turn secured through an oscillation bolt 32 through oscillation tube 30 to towing and lift frame 33 of the vehicle 11. (FIG. 11) Bolt 32 lies generally horizontally in the direction of tiller travel, and acts as an oscillation spindle. Tiller 10 may twist freely as a unit about bolt 32 in response to irregularities in the surface of the snow. Internal oscillation damping bushings, not shown, are especially desirable when tiller 10 is raised above the snow to be carried from one location to another. Center and side tiller sections 12, 13 and 14, in response to the snow surface, constantly deflect about hinges 22 and bolt 32. (FIGS. 12-14) This enables tiller 10 to reach substantially the entire surface of uneven snow all the way across the wavy contours of most ski paths.

Figure 6:
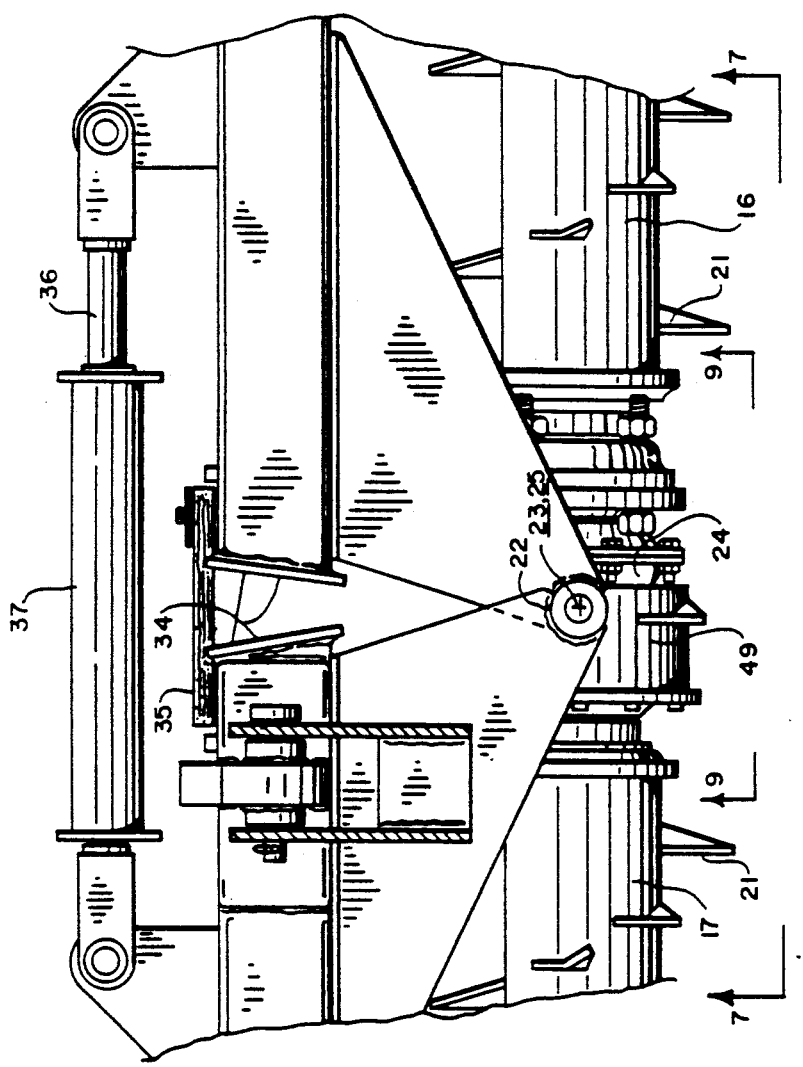
Figure 5:
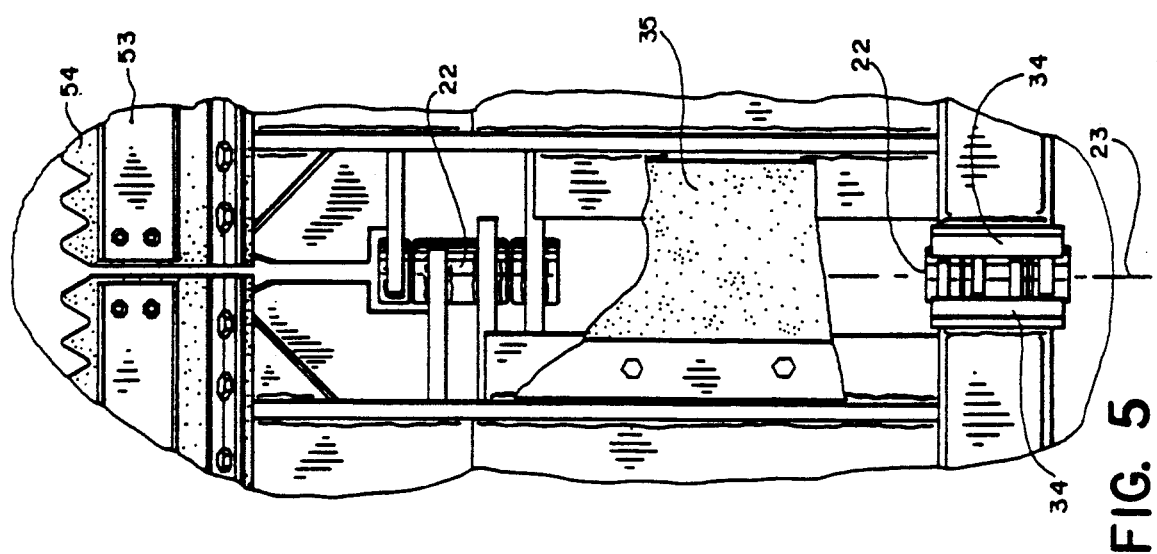
Figure 8:
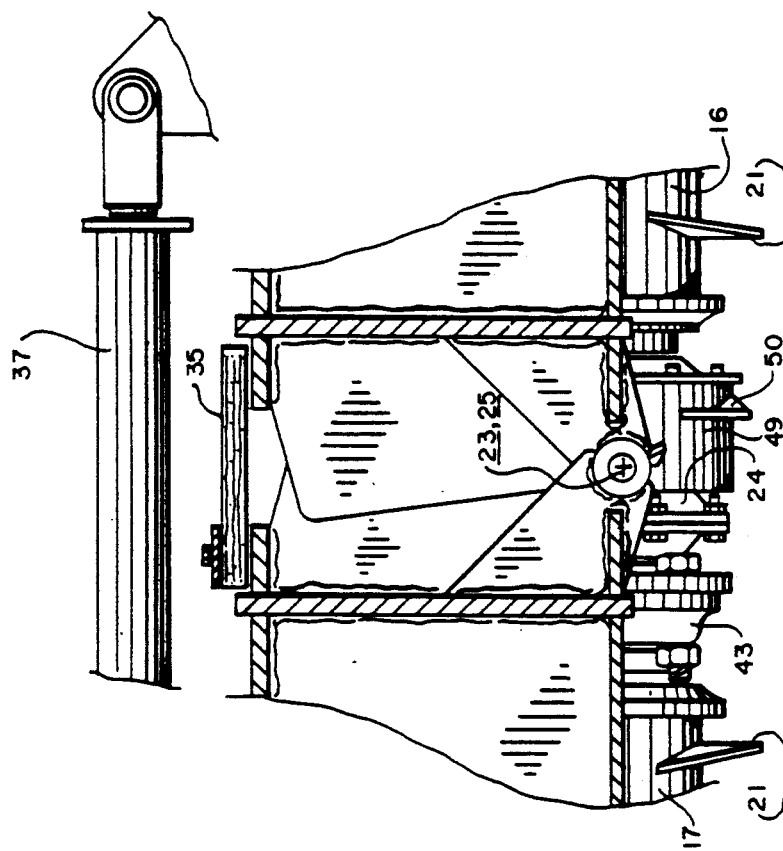
Figure 7:
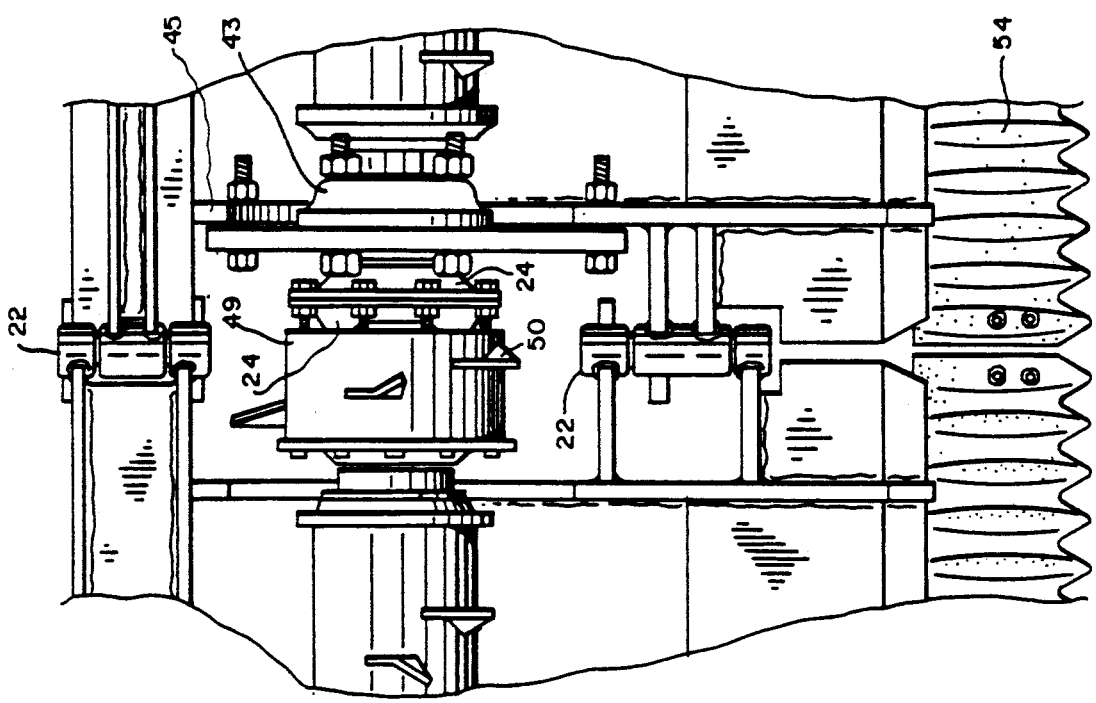

Clearance for relative motion between center frame 18 and end frames 19 and 20 is provided by beveled frame and tube ends 34. Flexible fabric cover plates 35 may be secured to span across the gaps between the beveled ends 34 to preclude jamming by rocks or ice. (FIGS. 5, 6 and 8) The approximately 28 degrees of deflection permitted by beveled ends 34 has been found to be adequate. The maximum deflection is actually limited to that permitted by the reciprocating travel of rams 36 in and out of cylinders 37.

By commands to control valves, not shown, the rams 36 may be hydraulically fixed in selected positions constituting, along with cylinders 37, selective length linkages. (FIGS. 1 and 6) Normally, however, rams 36 are left to slide freely in and out of cylinders 37 in response to continuous flexing between the tiller sections during operation.

Figure 2:
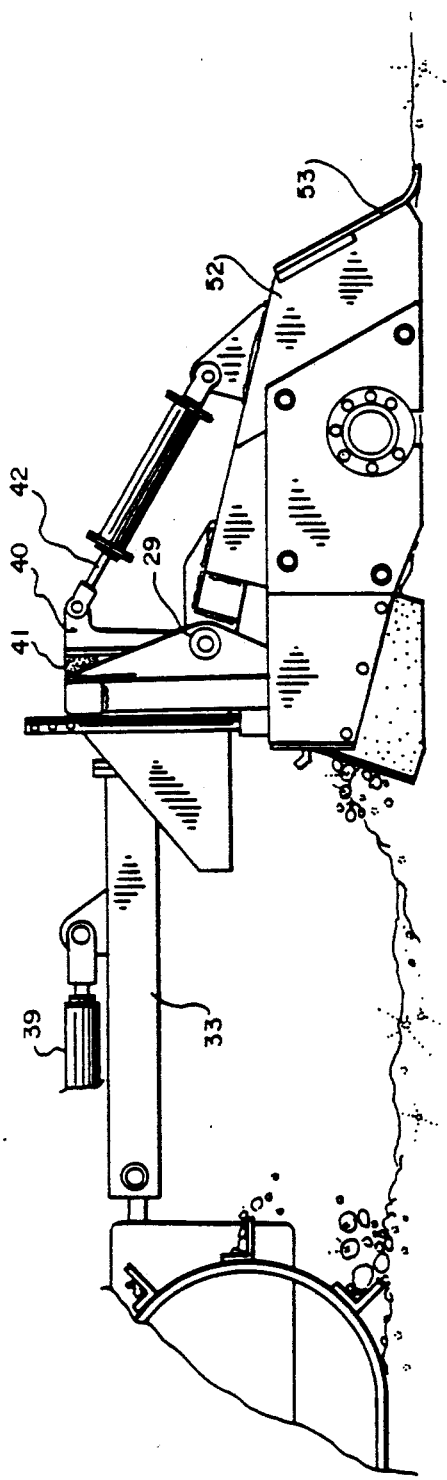
Figure 4:
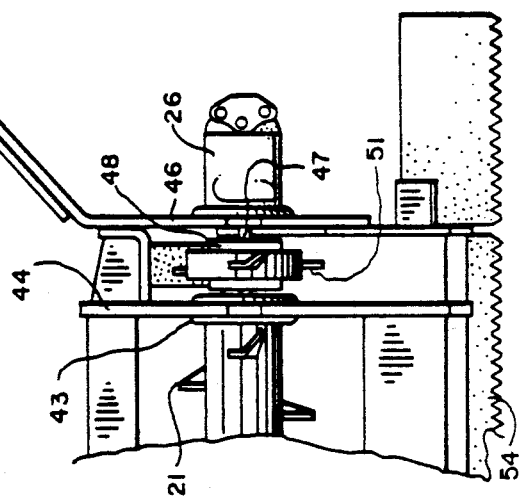
Figure 3:
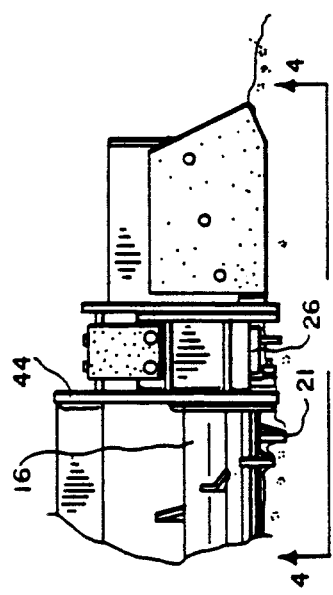

Lift frame 33 is joined by lateral pivots 38 to vehicle 11, so that tiller 10 may, if the operator desires, be allowed to move vertically as a unit to further follow uneven snow surfaces. Or, lift frame hydraulic cylinder and rams 39 may be used to hold the tiller firmly on the snow. Also, tiller rotation about laterally horizontal pivots 29 downwardly from normal operating position may sometimes occur. (FIGS. 1 and 2) However, tiller 10 is normally held in proper angle of attack with respect to the snow by adjustment of tiller mounted attitude adjusting arm 40, which bears on pad 41. Arm 40 adjusted in position by positioning of ram 42. (FIGS. 2 and 11)

Outside cutter bars 16 and 17 are mounted on frames 19 and 20 respectively by means of piloted flange, self-aligning bearings 43 on an outside frame end plate 44, and on an inside frame end plate 45. (FIGS. 3, 4 7 and 9) Center cutter bar 15 is supported by one of the universal joints 24 at each end, selected to withstand the high impact upon center cutter bar 15 from irregular, bumpy snow surfaces.

The reversible hydraulic motors 26 are each mounted on a plate 46 at the outside of each outside frame 19 and 20. A power output shaft 47 of motor 26 is joined to a cutter bar drive shaft by a shock absorbing polydisc coupling 48.

A joint protecting sleeve 49 mounted on each end of center cutter bar 15 extends around each universal joint 24. Radial snow cutting teeth 50 thereon till the snow in the gap between the ends of center and side cutter bars. (FIG. 7) Similarly, the outside housings of the polydisc couplings 48 carry snow cutting teeth 51, so that the snow is tilled substantially without interruption the full length of tiller 10 between the motor mounting plates 46.

Cutter bars 15, 16 and 17 may be rotated either forwardly with blades 21, 50 and 51 cutting the snow oppositely to the direction of travel, or reversely with the snow being cut toward the direction of travel. By the control of the rate of rotation of the cutter bars, the operator may control the degree for which the snow is conditioned. The snow tilled by the blades is propelled to the rear to be collected and compressed by an apron 52, and ultimately smoothed by the grooming bar 53 carrying combing teeth 54. (FIGS. 1, 2, 4 and 7)

Hydraulic motors 26 are operated simultaneously by hydraulic fluid supply lines, not shown, supplied from a source of pressurized hydraulic fluid provided by a pump carried by vehicle 11. Fluid return lines, not shown, convey used hydraulic fluid back to vehicle 11 for subsequent reuse. Valving, not shown, is provided to reverse the direction of flow of the fluid through both motors 26, to reverse the rotation of the motor drive shafts and the connected snow cutter bars.

Figure 15:
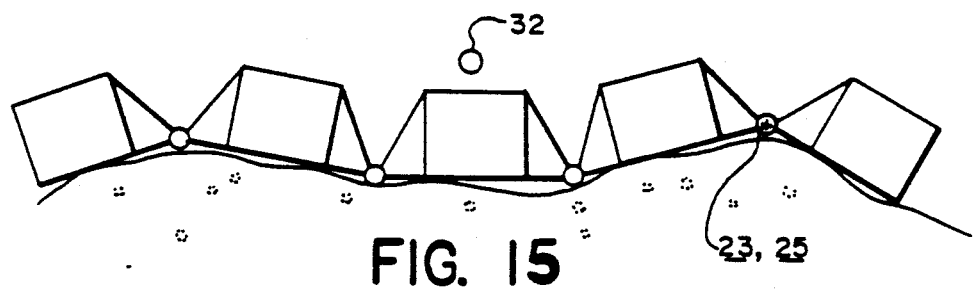

Embodiments other than the illustrated three-section, hydraulic motor powered, version may be employed without departing from the essence of the invention. For example, the number of flexibly joined tiller sections need not be limited to the illustrated three. See FIG. 15, schematically indicating a tiller having five tiller sections. Or, an embodiment having only two flexibly joined complete tiller sections, although not preferred, would also be within the spirit of the invention. (FIG. 16) In this embodiment, a towing bar 55 carries a pair of spaced apart ball joints 56 with extending axles 57 engaged by clevises 58 secured to each of the pair of tiller frames 59. Also, the cutter bars could be driven by other types of motors, or even by power takeoffs or the like from the vehicle. Nor is it required that tiller mounted motors be on the outside tiller sections. For example, a reversible hydraulic motor 26 could be mounted frame 18 of center tiller section 12, linked by appropriate gearing to the center cutter bar 15 to drive all the cutters. See FIG. 17 showing a motor 26 engaging the two parts of a split cutter bar 15 through a gear box 60, having a pair of power output shafts.

The invention may be embodied in still other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A rotary snow tiller having means permitting the movement thereof over the snow by a propelling vehicle, and means permitting control thereof by the operator of the vehicle, said tiller comprising:
    at least two tiller sections each having a frame and an elongate cutter bar with outstanding snow cutting teeth;
    means flexibly connecting the tiller sections together end to end, said connecting means comprising hinges connecting the frames, each frame hinge having an axis lying generally in the direction of tiller travel, and universally flexing joints connecting the cutter bars, each joint having a center of flexure geometrically fixed with respect to said joint and being supported in fixed relationship to one of the frames so that the associated frame hinge axis passes through said fixed center of flexure, and so that the frame and the cutter bar of each tiller section are constrained to rotate about an associated frame hinge as a unit in fixed geometric relationship to each other; and
    means connecting at least one of the tiller sections to the propelling vehicle.

2. The tiller of claim 1, further comprising:
    power means for rotating the connected cutter bars about the longitudinal axes thereof.

3. The tiller of claim 2, wherein:
    the power means is mounted upon at least one of the tiller section frames.

4. The tiller of claim 3, wherein:
    the tiller to vehicle connecting means permits the tiller to freely rotate about a horizontal axis lying in the direction of tiller travel.

5. The tiller of claim 4, wherein:
    the power means includes provisions for rotating the cutter sections in elected direction.

6. The tiller of claim 5, each tiller section further comprising:
    grooming means acting upon the snow tilled by the cutter bars.

7. The tiller of claim 6, wherein:
    the grooming means comprises a snow directing apron and a grooming bar.

8. The tiller of claim 5, wherein:
    the power means comprises a reversible hydraulic motor mounted at the outside end of the frame of at least one of the outermost tiller sections, engaging the outside end of the cutter bar of said section.

9. The tiller of claim 7, wherein:
    the power means comprises a reversible hydraulic motor mounted at the outside end of the frame of at least one of the outermost tiller sections, engaging the outside end of the cutter bar of said section.

10. The tiller of claim 4, wherein:
    the tiller to vehicle connecting means further comprises a horizontal pivot about an axis lateral to the direction of tiller travel, permitting the tiller to rotate thereabout in response to the surface of the snow.

11. The tiller of claim 9, wherein:
    the tiller to vehicle connecting means further comprises a horizontal pivot about an axis lateral to the direction of tiller travel, permitting the tiller to rotate thereabout in response to the surface of the snow.

12. The tiller of claim 1, further comprising:
    a selective length linkage mounted to act between the tiller frames at each hinge.

13. The tiller of claim 4, further comprising:
    a selective length linkage mounted to act between the tiller frames at each hinge.

14. The tiller of claim 11, further comprising:
    a selective length linkage mounted to act between the tiller frames at each hinge.

15. The tiller of claim 12, wherein the selective length linkage comprises:
    hydraulic cylinder and ram means.

16. The tiller of claim 13, wherein the selective length linkage comprises:
    hydraulic cylinder and ram means.

17. The tiller of claim 11, further comprising selective length linkage means comprising:
hydraulic cylinder and ram means.

18. A rotary snow tiller having means permitting the movement thereof over the snow by a propelling vehicle, and means permitting control thereof by the operator of the vehicle, said tiller comprising:
three tiller sections each having a frame, an elongate cutter bar with outstanding snow cutting teeth, a snow directing apron, and a snow grooming bar;
means flexibly connecting the tiller sections together end to end, said connecting means comprising hinges connecting the frames, each frame hinge having an axis lying generally in the direction of tiller travel, and universally flexing joints connecting the cutter bars, each joint having a center of flexure geometrically fixed with respect to said joint and being supported in fixed relationship to one of the frames so that the associated frame hinge axis passes through said fixed center of flexure, and so that the frame and the cutter bar of each tiller section are constrained to rotate about an associated frame hinge as a unit in fixed geometric relationship to each other; and
means connecting the center tiller section to the propelling vehicle rotatably about a horizontal axis lying in the direction of tiller travel.

19. The tiller of claim 18, wherein:
the cutter bars of all tiller sections are powered by a hydraulic motor mounted upon at least one of the frames of the tiller sections, engaging the cutter bar of said section.

20. The tiller of claim 18, further comprising:
a gear box with an input shaft and a pair of axially aligned opposing output shafts; wherein
the cutter bars of all tiller sections are powered by a hydraulic motor mounted upon the frame of the center tiller section engaging the input shaft of the gear box; and
the center cutter bar is constructed in two parts, each engaged by one of the gear box output shafts.

21. The tiller of claim 18, wherein:
the cutter bars of all tiller sections are powered by a hydraulic motor mounted at the outside end of the frame of at least one of the outside tiller sections engaging the outside end of the cutter bar of said section.

22. The tiller of claim 18, wherein:
the tiller to vehicle connecting means further comprises a horizontal pivot about an axis lateral to the direction of tiller travel, permitting the tiller to rotate thereabout in response to the surface of the snow.

23. The tiller of claim 18, further comprising:
hydraulic cylinder and ram means mounted to act between the tiller frames at each hinge.

24. The tiller of claim 22, further comprising:
hydraulic cylinder and ram means mounted to act between the tiller frames at each hinge.

25. A rotary snow tiller having means permitting the movement thereof over the snow by a propelling vehicle, and means permitting control thereof by the operator of the vehicle, said tiller comprising:
a pair of tiller sections each having a frame and an elongate cutter bar with outstanding snow cutting teeth;
means flexibly connecting the tiller sections together end to end, said connecting means comprising a hinge connecting the frames, said frame hinge having an axis lying generally in the direction of tiller travel, and a universally flexing joint connecting the cutter bars, said joint having a center of flexure geometrically fixed with respect to said joint and being supported in fixed relationship to one of the frames so that the associated frame hinge axis passes through said fixed center of flexure, and so that the frame and the cutter bar of each tiller section are constrained to rotate about an associated frame hinge as a unit in fixed geometric relationship to each other; and
means connecting at least one of the tiller sections to the propelling vehicle.

26. The tiller of claim 25, wherein the means connecting the tiller to the vehicle include:
an elongate bar parallel to the tiller;
a pair of ball joints carried spaced apart on said bar, the ball of each having an axle member extending radially from opposite sides thereof; and
a clevis carried by the frame of each tiller section engaging the axle member of one of said balls.

27. The tiller of claim 26, further comprising:
hydraulic cylinder and ram means mounted to act between the tiller frames at each hinge.

* * * * *